US 6,605,809 B1

(12) United States Patent
Engels et al.

(10) Patent No.: US 6,605,809 B1
(45) Date of Patent: Aug. 12, 2003

(54) EVALUATION UNIT TO EVALUATE DETECTOR EVENTS

(75) Inventors: Ralf Engels, Hürtgenwald (DE); Richard Reinartz, Langerwehe (DE); Jakob Schelten, Jülich (DE); Heinz Rongen, Düren (DE); Uwe Clemens, Gellenkirchen (DE)

(73) Assignee: Forschungszentrum Jülich GmbH, Jülich (DE)

( * ) Notice: Subject to any disclaimer, the term of this patent is extended or adjusted under 35 U.S.C. 154(b) by 29 days.

(21) Appl. No.: 09/687,595

(22) Filed: Oct. 13, 2000

(30) Foreign Application Priority Data

Oct. 21, 1999 (DE) .......................................... 199 50 915

(51) Int. Cl.$^7$ ................................................ G06F 1/16
(52) U.S. Cl. ........................................ 250/394; 250/366
(58) Field of Search ................................ 250/394, 366, 250/369, 363.1, 363.02, 363.06, 370.01, 370.06, 370.09, 370.11, 252.1

(56) References Cited

U.S. PATENT DOCUMENTS 5,774,522 A * 6/1998 Warburton .................... 378/91
5,873,054 A * 2/1999 Warburton et al. ......... 250/370.6
6,080,984 A * 6/2000 Friesenhahn ............... 250/252.1
6,194,715 B1 * 2/2001 Lingren et al. ............ 250/252.1
6,194,726 B1 * 2/2001 Pi et al. .................... 250/363.1

OTHER PUBLICATIONS

P.J. Pietraski et al., "Digital Centroid–Finding Electronics for High–Rate Detectors", IEEE Trans. on Nuclear Science, vol. 46, No. 4, Aug. 1999, pp. 810–816.*
M. Heiderich, et al., "A two–dimensional scintillation detector for small angle neutron scattering," *Nuclear Instruments and Methods in Physics Research,* pp. 423–432 (1991).

* cited by examiner

*Primary Examiner*—Constantine Hannaher
*Assistant Examiner*—Otilia Gabor
(74) *Attorney, Agent, or Firm*—Connolly Bove Lodge & Hutz LLP

(57) ABSTRACT

The invention relates to an evaluation unit to evaluate detector events registered by one or more detectors, whereby the evaluation unit contains signal processors that serve to process the signals from the detectors.

Figure 1:
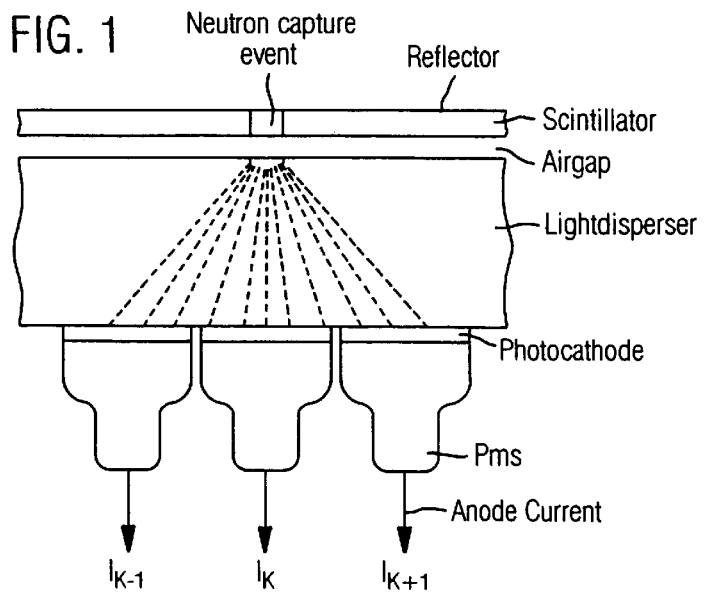

According to the invention, the evaluation unit is characterized in that it has at least one distributor that relays the signals from the detector to at least one selected signal processor.

16 Claims, 8 Drawing Sheets

VME Backplane

- Data — 32
- *Rd
- *CS InBoard — 4
- Event — 4
- Serial load — 2

Private FPGA/Analog Backplane

Control
80 MHz Clock (from Backplane)
Reset TOF Counter
Peak Signal
FPGA Reset

- Control — 8
- 18xADC

EVALUATION UNIT TO EVALUATE DETECTOR EVENTS

BACKGROUND OF THE INVENTION

1. Field of the Invention

The invention relates to an evaluation unit to evaluate detector events registered by one or more detectors, whereby the evaluation unit contains signal processors that serve to process signals from the detectors.

2. Description of the Related Art

An evaluation unit of this type is known from the article titled "Digital Centroid-Finding Electronics for High-Rate Detectors" by P. J. Pietraski, Z. Zojceski, D. P. Siddons, G. C. Smith and B. Yu, Brookhaven National Laboratory, Upton, N.Y. 11973, United States, 1998 in the IEEE Nuclear Science Symposium. With this detector system, individual detectors of a detector system are combined to form segments. Each segment has a digital signal processor that processes the signal.

A two-dimensional, position-resolving detector for sub-thermal neutrons is known from prior public use at the Julich Research Center. Here, the physical conversion of neutrons into light takes place in a 1-mm thick $^6$Li-glass scintillator. The read-out of the 8×8 photomultiplier and the determination of the position of the event are done with a coarse-fine method by means of a computer specially designed for this purpose using tabular evaluation. The maximum counting rate of the system currently lies at 100 kHz.

Continuous improvement of the beam control has made it possible to increase the beam intensity at the sampling position and thus also the counting rate of the scattered neutrons on the detector. As a consequence, lag time effects occur with many samples that scatter strongly. On the other hand, in the case of samples that only scatter slightly and with correspondingly longer measuring times, the γ-background has a negative effect.

The known detector system, as described in Nuclear Instruments and Methods A305 (1991), pages 423 through 432, has the following values:

| | |
|---|---|
| active surface area of the detector | 600 x 600 mm$^2$ |
| position resolution | 8 mm |
| detection sensitivity | 96% for 8 Å neutrons |
| counting rate | 100 kHz |
| γ-sensitivity | 0% for $E_\gamma$ < 1 MeV |
| | <2 x 10$^{-4}$ for $E_\gamma$ 1 > 1 MeV |

The γ-sensitivity is estimated by means of the following measurements:

background of the detector caused by cosmic radiation, scintillator effects, etc.: approximately 12 to 14 cm$^{-2}$h$^{-1}$;

the same detector installed in a radiation housing and in a detector tube: approximately 6 to 7 cm$^{-2}$h$^{-1}$;

γ-background in the case of irradiation with a $^{60}$Co source (1.3 MeV-γ) approximately 4 mrem h$^{-1}$ on the detector surface: approximately 35 to 53 cm$^{-2}$h$^{-1}$. The dose rate measured with a dosimeter corresponds to a γ-current density of 2×10$^3$ γcm$^{-2}$s$^{-1}$ or 72×10$^5$ γcm$^{-2}$h$^{-1}$. Consequently, the γ-sensitivity of the detector is approximately 1×10$^{-5}$.

γ-background in the measurement using neutrons, whereby approximately half of the detector surface area is covered with a 1-mm cadmium plate: approximately 53 to 64 cm$^{-2}$h$^{-1}$.

The event of an absorbed neutron is represented by its signals generated on the 64 photomultipliers (PM). These signals, most of which consist merely of electronic noise, are used to form the address of a memory position whose content is then increased by 1.

The storage should be done according to the position where the neutron absorption has taken place. This is only possible to a limited extent since the available PM signals $S_{ik}$ are stochastic quantities that fluctuate around their anticipated values $B_{ik}$ (x, y) and thus do not constitute clear-cut functions of the position. Only their anticipated values are well-defined functions of the position of the neutron absorption. In principle, the position cannot be determined any more precisely than by searching for the most likely position for the generated PM signals. For this purpose, it is necessary to know the anticipated values of all of the multiplier signals as a function of the event positions (x, y). The memory addresses then become identical—except for a scale factor and an offset value—to the most likely positions ascertained ($x_w$, $y_w$). An event is then stored in that the content of the memory cell is increased by 1.

SUMMARY OF THE INVENTION

The invention has the objective of creating an evaluation unit of the generic type by means of which the signal events can be reliably detected and quickly further processed.

According to the invention, this objective is achieved in that an evaluation unit of the generic type is configured in such a way that it contains at least one distributor that relays the signals from the detectors to at least one selected signal processor.

The evaluation unit can be configured in different ways. In particular, it is possible to design the evaluation unit in such a manner that its components are optimized for performing one or more prescribed evaluation processes.

For instance, it is advantageous to equip the evaluation unit with analog output channels, preferably also analog pulse shapers, and to provide analog-digital transducers subsequent to the pulse shapers.

The above-mentioned arrangement allows the signal to be detected especially quickly, as is desired in online operations. The invention, however, also encompasses embodiments in which the evaluation unit is completely digital or completely analog, or else it has a different division between analog and digital components.

Especially fast and reliable signal processing can be achieved in that the distributor is a digital module. The distributor is preferably an Application Specific Integrated Circuit (ASIC). In particular, this module is a digital gate array, preferably a Field Programmable Gate Array (FPGA). A Field Programmable Gate Array entails the special advantage of being freely programmable.

The system is suited for any counting rates and is also well-suited for high counting rates in the range from 1 MHz to several MHz.

The evaluation unit and the detector system equipped with such a unit are especially suited for a large number of channels, for example, 256×256 channels. Such a large number increases the resolution for partial sectors (subsectors).

The detection and/or evaluation speed can be increased by configuring the distributor in such a way that it relays a signal to be processed to a signal processor that has free processing capacity.

In this manner, measurements can be carried out in real time.

Interference signals can be suppressed in that the evaluation unit has at least one module that performs a differentiation operation. This eliminates slow interference signals.

Another improvement of the suppression can be achieved if the module is a shaping amplifier.

An increase in the reliability of the data processing can be achieved in that the signal processors are digital signal processors.

In order to attain low-interference data transmission, it is advantageous for optical waveguides to be employed—at least in some areas—for the data transmission.

In order to be able to utilize the detector system for time-of-flight measurements, it can be configured in such a way that the evaluation unit can allocate radiation events to time-of-flight channels that are different from each other.

In order to permit detection in real time during the time-of-flight measurements and/or other time-critical applications, it is advantageous to provide memory banks having a data capacity of at least 24 bits. Memory banks with a data capacity of at least 32 bits are particularly advantageous.

Another advantage of various configurations of the detector system according to the invention is the possibility of integrating it into an existing software system for purposes of data transmission as well as of the start/stop, interruption/continuation of the measurement as a function of external parameters.

This is a future-oriented detector system that stands out for technologies involving pulse processing, for instance, digital signal processing and components adapted to such technologies.

The read-out electronic system can replace the existing electronic system, so that existing evaluation and control software can continue to be used. Moreover, it is also an autarchic system that is suitable for a wide array of experiments. Adaptation to an already existing system can preferably be done with an interface to an already existing electronic system. The system is scalable with respect to the computing capacity. For this purpose, it is advantageous—depending on the execution time needed for the algorithms used—to employ one or more signal processors, especially digital signal processors (DSPs), whereby the number of signal processors to be used does not bring about any changes in the basic structure of the system.

Additional advantages, special features and practical refinements of the invention can be gleaned from the subordinate claims and from the following presentation of preferred embodiments, with reference to the figures.

BACK DESCRIPTION OF THE DRAWINGS

Figure 2A:
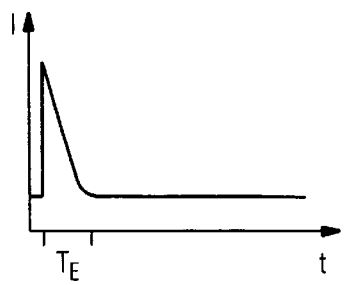
Figure 2B:
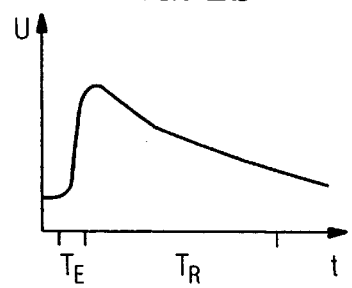
Figure 2C:
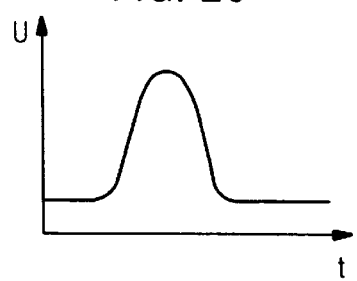
Figure 3:
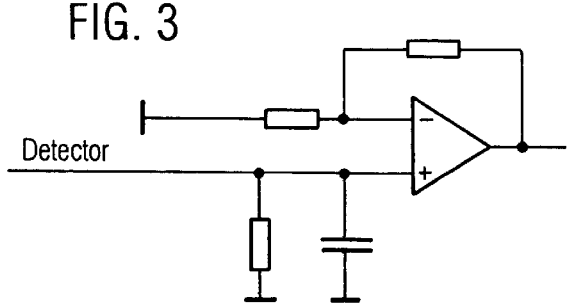
Figure 4:
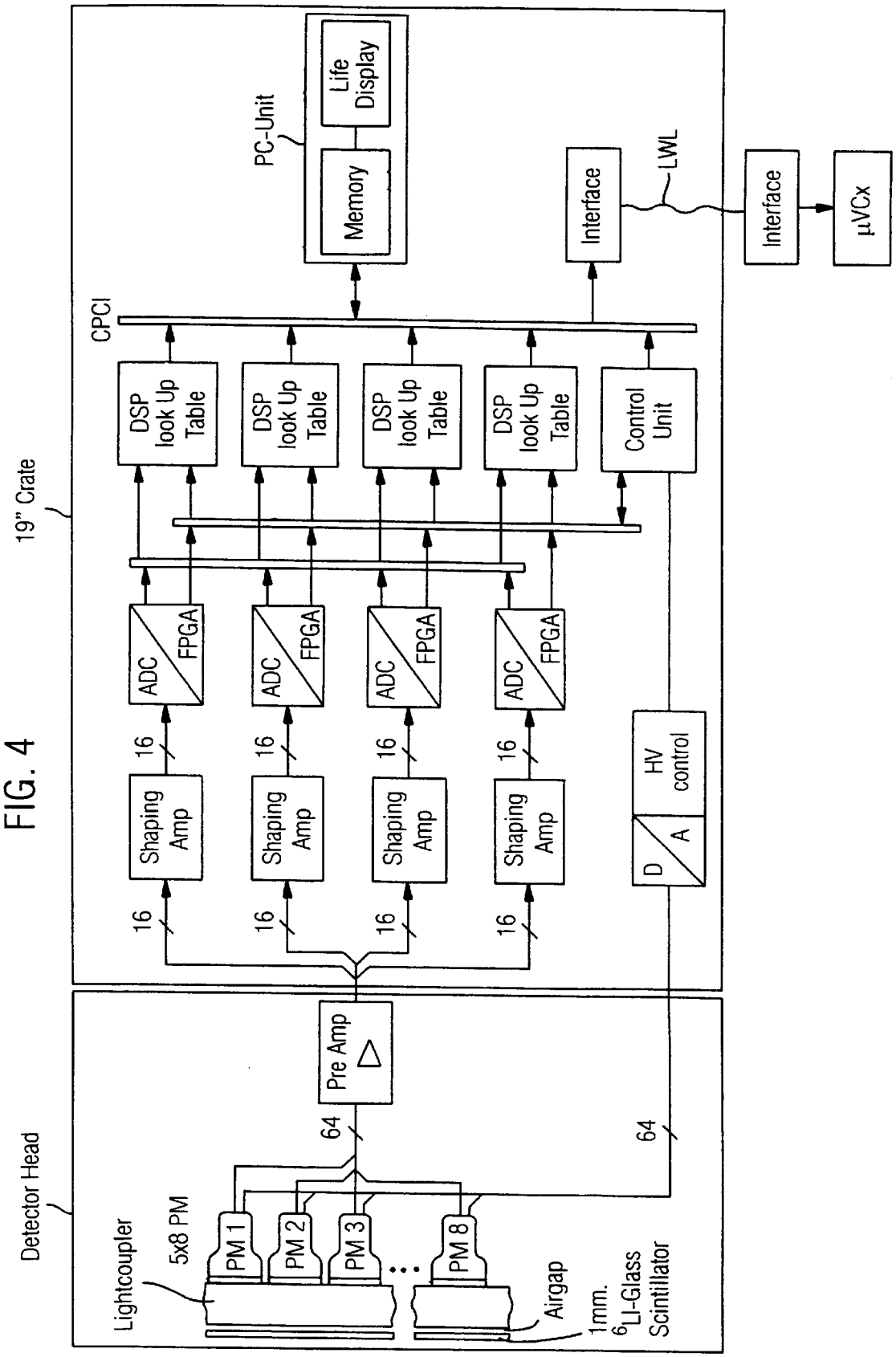
Figure 5:
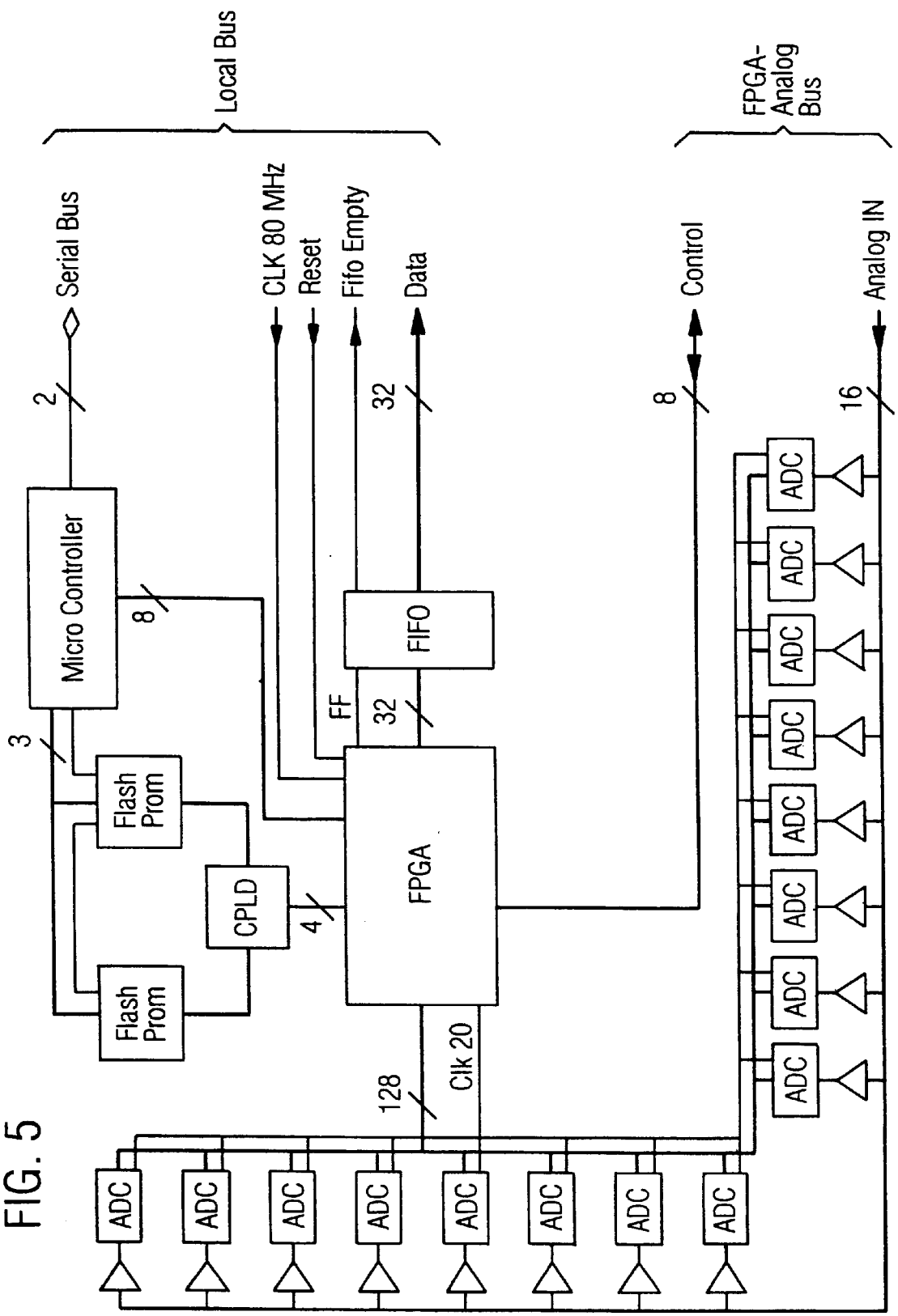
Figure 6:
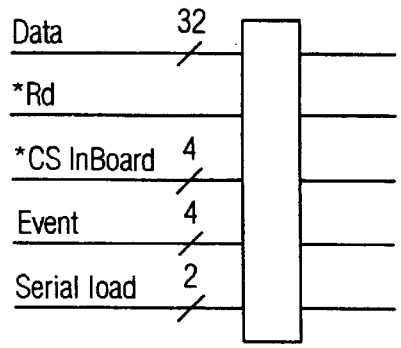
Figure 7A:
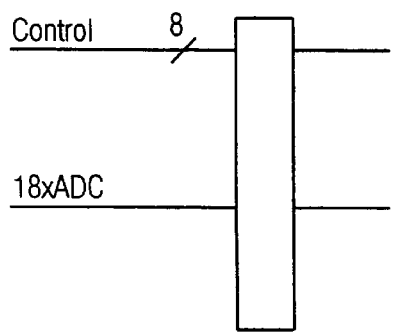
Figure 8:
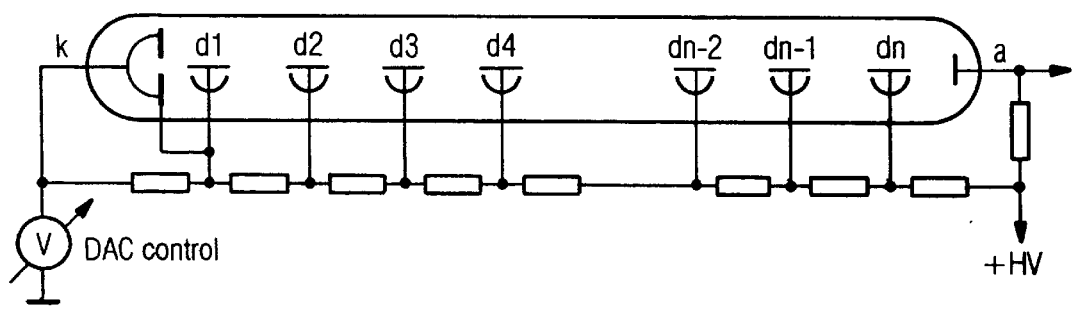
Figure 7B:
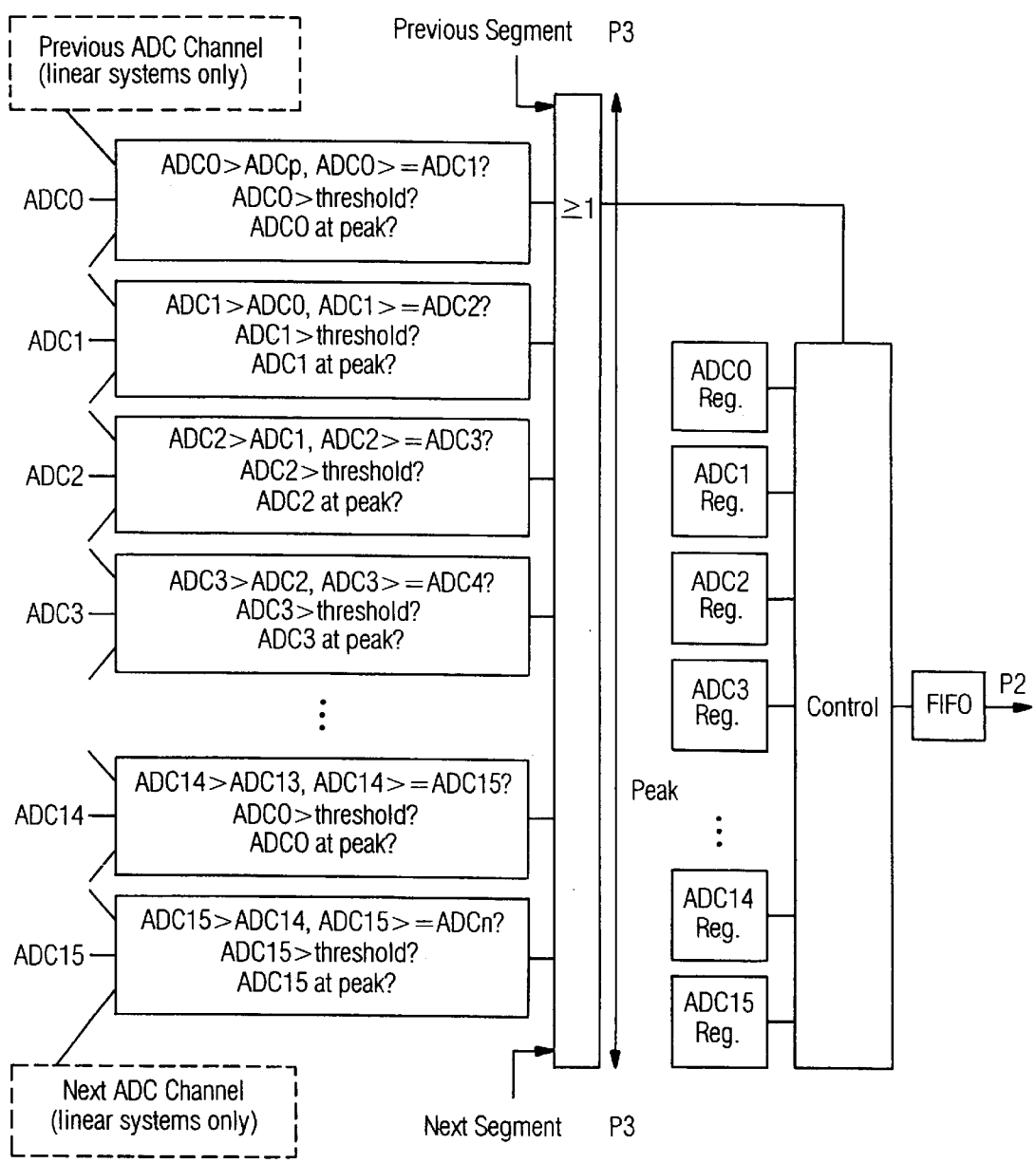
Figure 9:
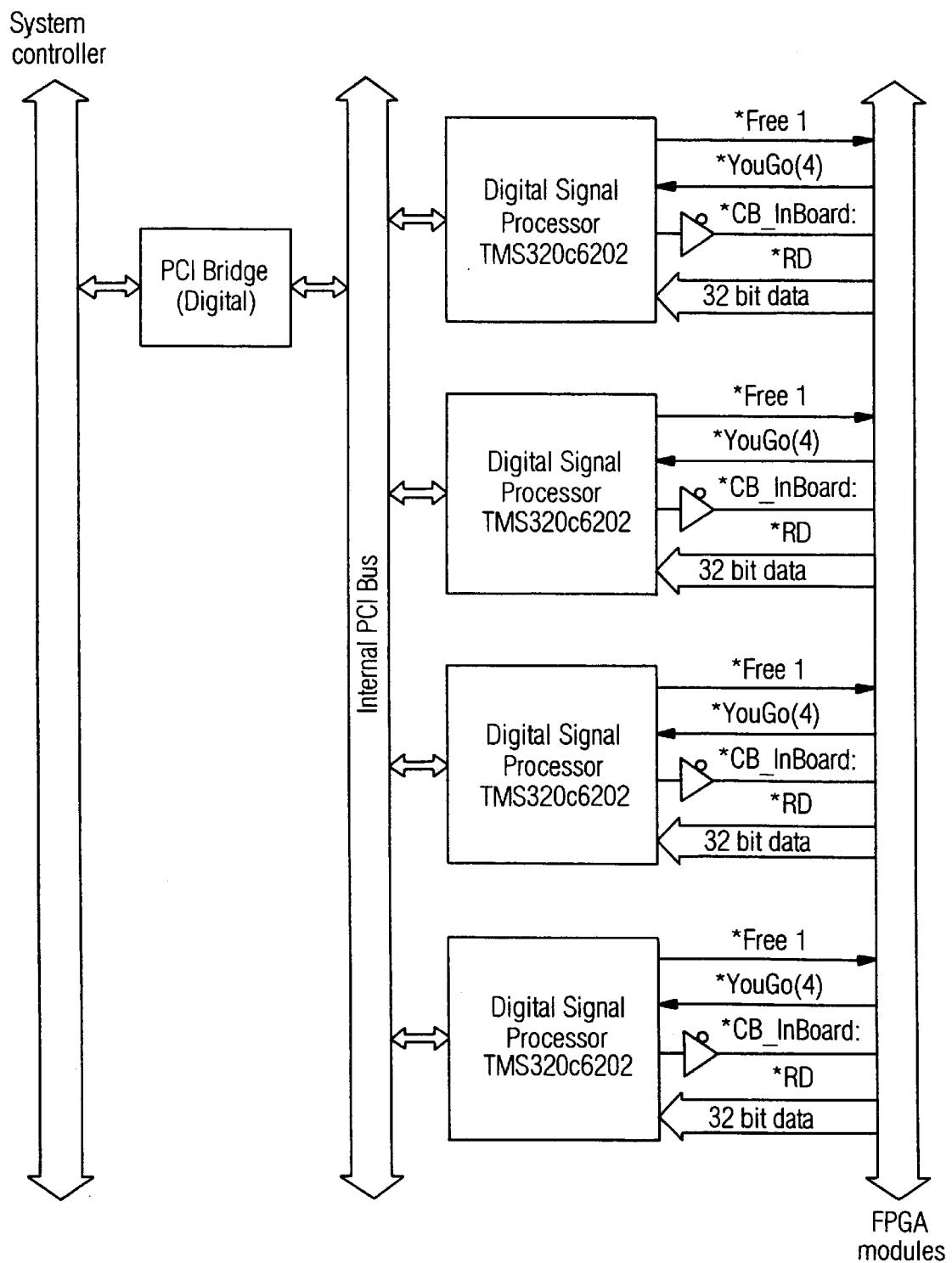
Figure 10:
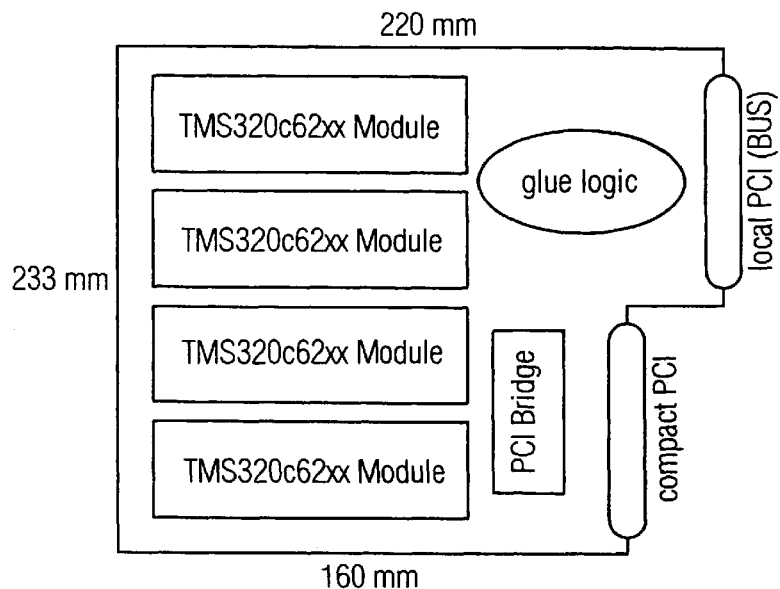
Figure 11:
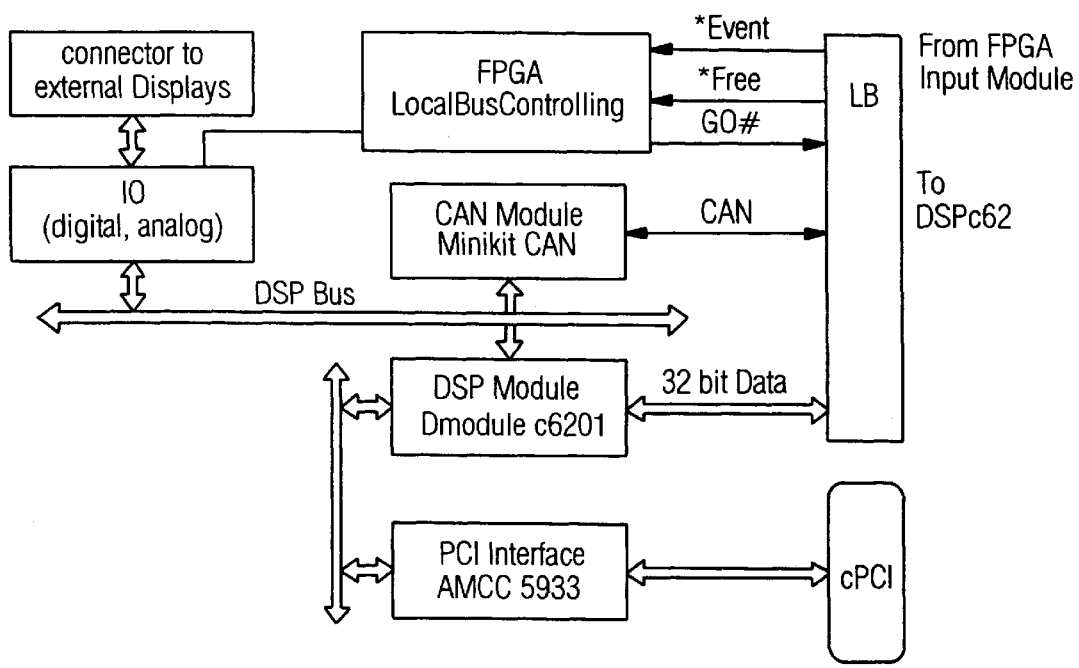

The following is shown:

FIG. 1: a schematic diagram to illustrate the light distribution over several photo-multipliers PM;

FIG. 2: in three partial views, a signal curve (a) on a detector (b) after connecting a pre-amplifier (c) after connecting a shaping amplifier;

FIG. 3: a schematic circuit diagram of a voltage-sensitive amplifier that is suitable for the detector system;

FIG. 4: a depiction of the course of the most important signals in the detector system;

FIG. 5: a functional block diagram of a FPGA/ADC module contained in an evaluation unit;

FIG. 6: a first FPGA/ADC bus structure;

FIG. 7: another FPGA/ADC bus structure;

FIG. 7b: modules to ascertain a detection signal;

FIG. 8: a schematic set-up of a photomultiplier PM used in the detector system;

FIG. 9: a preferred signal course in the signal processors;

FIG. 10: a schematic set-up of an arrangement of signal processors;

FIG. 11: a functional block diagram of a local bus controller LBC; and

Figure 12:
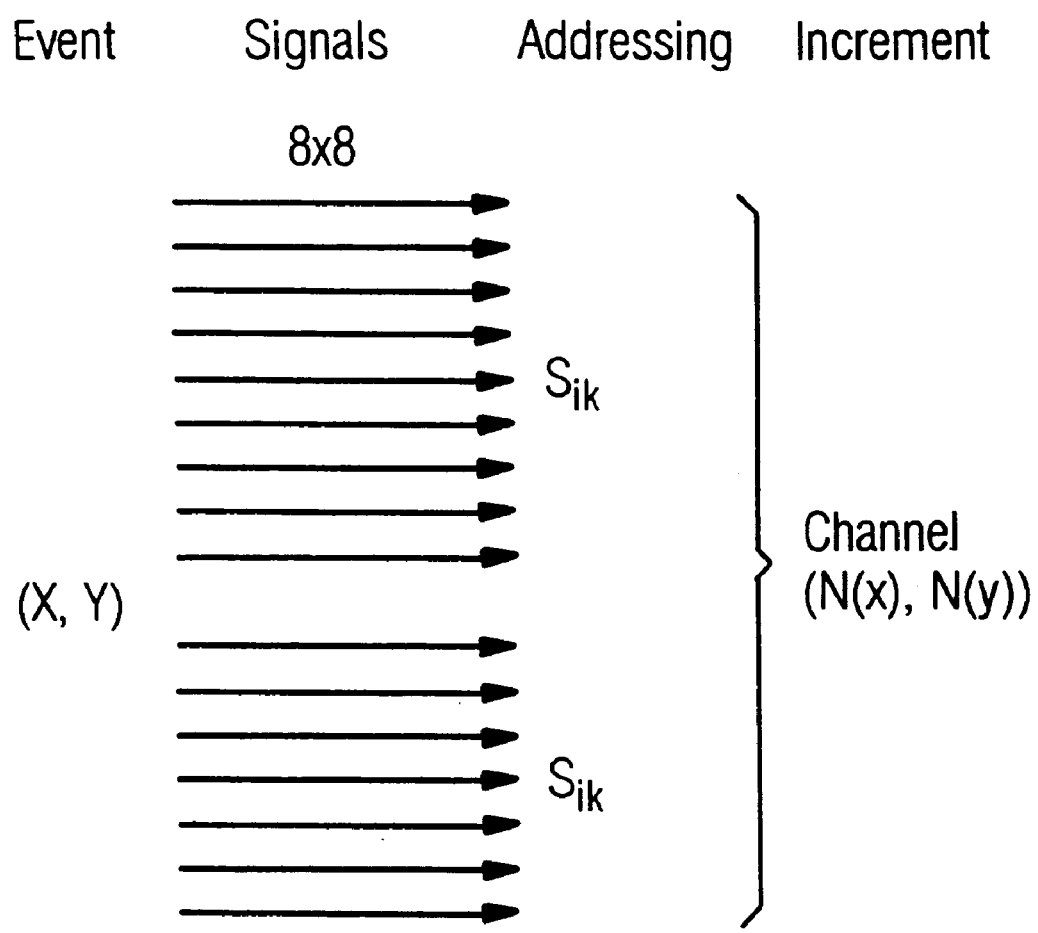

FIG. 12: the addressing of a memory cell to store a detection event.

DESCRIPTION OF EMBODIMENTS OF THE PRESENT INVENTION

A detection system having an evaluation unit according to the invention will be described below. The evaluation unit does not presuppose a special design of the detector system. Moreover, the term "detector" should be understood in its broad sense. It comprises any sensor that registers the occurrence of one or more events. The event can be, for instance, a radiation event, although other events such as, for example, a chemical or physical change of a surface can likewise be detected.

The evaluation unit can work together with different detector systems, so that it is very versatile in its use.

The detector head shown as an example in FIG. 1 to illustrate the light distribution over three photomultipliers PM has a larger number of photomultipliers in a preferred case in actual practice. The structure of a suitable detector head in a vacuum housing consists of a two-dimensional arrangement of, for example, 8×8=64 photomultipliers (PM) having a diameter of about 10 cm.

The photomultipliers PM are preferably mounted equidistantly on an optical coupling device. The thickness of the optical coupling device is selected in such a way that the light generated through neutron capture in a scintillator is limited to an angle of emergence of 90° by a narrow air gap between the scintillator and the optical coupling device and it is distributed over a surface of at least 3×3 photomultipliers PM. The amplification of each photomultiplier PM can be adjusted by varying the cathode voltage in order to compensate for amplification fluctuations. The output signal of the photomultipliers PM is supplied by pre-amplifiers present in the read-out electronic system.

In a first detector head, suitable photomultipliers are used such as, for instance, the XP2312 photomultipliers made by Phillips and having a passive voltage divider. A particularly advantageous detector head makes use of a more advanced tube, for example, type XP5312 made by PHI, and having a transistorized voltage divider. The photomultipliers are mounted on suitable positions in the detector.

In the area of the photocathodes all the way to the first dynode, every photomultiplier is shielded against the earth's magnetic field as well as other, weaker magnetic fields acting from the outside by means of a shielding cylinder made, for instance, of a highly permeable material such as MUMETALL®. Any material having a high permeability can be utilized for shielding purposes. Such shielding is especially advantageous for detectors that can be influenced by magnetic fields. However, since the invention is not in the least limited to the detectors cited, but rather, encompasses all detectors with which detection events are ascertained, such shielding is superfluous for these other detectors.

The detector system can be operated with any kind of detectors. Suitable detectors include $^6$Li-glass glass scintillators (type GS20), which are manufactured by the Applied Scintillation Technologies company. The entire scintillator measures 600 mm×600 mm×1 mm in size and consists of sixteen individual parts measuring 150 mm×150 mm×1 mm. This scintillator is mounted on a DESAG B270 carrier glass (605 mm×650 mm×3 mm) by means of an optical adhesive.

The DESAG B270 carrier glass is a boron glass that serves to absorb additional neutrons. Such shielding is superfluous for detectors that do not register neutrons. In the case of detectors that register radiation events, it is practical to have neutron shielding in order to reduce the noise and to increase the signal-to-noise ratio although, once again, this is not absolutely necessary.

Preferably, detectors are chosen that, in a pulse height analysis, have a tolerance of ±5% at the maximum. The selected pieces are then used to assemble the complete scintillator. The entire scintillator surface is coated on one side (neutron side) with a reflective paint.

Another suitable alternative is a LiY-borate scintillator. The use of this scintillator would improve the γ-sensitivity.

When measurements are performed with this detector arrangement, incident light on the photocathode releases electrons into the photomultipliers PM. These electrons are amplified in the photomultipliers PM by a factor of $10^5$ to $10^6$. This current is collected on an integration condenser C, whereby the charge Q is proportional to the voltage, which is then further processed by the pre-amplifier.

The RC combination is selected in such a way that the decay time constant is about 50 μs in order to optimize the filter amplifier located downstream. The pre-amplifier employed is preferably a voltage-sensitive pre-amplifier with an FET input that serves to eliminate any leakage currents. The term voltage-sensitive pre-amplifier especially refers to an amplifier that amplifies a voltage signal on the input side by a factor V. This amplification factor is normally expressed in dB as a power amplification $V_p$ and it is calculated on the basis of the voltage amplification factor V:

$$V_p[dB]=20 \log V$$

FIG. 3 shows an equivalent circuit diagram for a non-inverting voltage amplifier that is utilized as a pre-amplifier for a PM.

In order to obtain a clear and easily digitizable signal as well as to improve the signal-to-noise ratio, it is advantageous to use a so-called shaping amplifier that differentiates rapid rises in the output signal of the pre-amplifier, then integrates them n-times and generates a signal whose level is proportional to the voltage step and thus to the generated charge Q. With this differentiation, slow signals (50 Hz) are not transmitted. The pre-amplifier signal is then transmitted to the main amplifier via a cable, for example, an RG159 (Lemo) cable.

The fixture that holds the electronic components preferably consists of a suitable frame, for instance, a double-euroframe, that holds the individual modules and a single-euroframe with the power supply. A high-voltage mains power supply is preferably located in a standardized plug-in unit, for example, a 19-inch plug-in module. Highly integrated data channels, for instance, FPGA channels, are employed for fast digital signal analysis. In each case, the data supplied by these channels reaches a "free DSP" via a rapid distributor, for example, a crossbar switch with a data capacity of many MB/s to several GB/s. Sufficently high distribution rates in conjunction with a structurally simplified design are preferably attained with data capacities in the range of about 80 MB/s. A local bus controller assumes the control over this data path.

The arrangement of the modules and of a signal course is shown as examples in FIG. 4. Here, a suitable number of photomultipliers PM is arranged in a suitable formation. In the case presented here, the photomultipliers PM are combined in an 8×8 matrix. Outputs of several photomultipliers PM, preferably outputs of all photomultipliers PM, are connected to the input of a pre-amplifier (PreAmp). The pre-amplifier has several outputs that are connected to inputs of shaping amplifiers (ShAmp). With a number N of photomultipliers PM (64 in the case shown here) which are connected to the pre-amplifier and with a data capacity that corresponds to the signals from 1 photomultiplier PM (16 in the case shown here), N/1 pre-amplifiers (4 in the case shown here) process signals from 1 photomultiplier PM in each case.

The mechanical structure of the individual modules in the main frame can be as desired and has, for example, the following components:
  all modules in the "extended, double-eurocard" format (6 HE);
  220 mm×233.35 mm, printed circuit boards with PCI bus: bottom part 160 mm deep;
  maximum width per module: 4 TE=20.4 mm
Preferred modules are:
  several, preferably up to 4, analog modules, each with 16 analog inputs (main amplifier, shaper);
  several, preferably up to 4, FPGA modules; each FPGA module processes 16 analog inputs;
  one DAC module for the cathode voltage of the individual PMs;
  several, preferably up to 4, DSPc62xx modules; each module carries 4 TMS320c62xx digital signal processors;
  a local bus controller (LBC) arbitration of the DSP, CAN bus interface, LED displays;
  a CPU system with a Pentium-based computer running Windows NT or Linux.

It is advantageous to provide several, for example, three, backplanes, in particular:
  compact PCI (standard cPCI, 8 slots), communication between DSP modules and the CPU system;
  private bus (VME backplane is used) communication between FPGA and DSP modules as "crossbar switch";
  FPGA and analog FPGA interconnections (2*PCI connector on 3 HE).

The bus systems are set up in a 19-inch frame, for example, as follows:

A multiframe contains a "double-euro, 6HE, 84 TE" for the entire electronic system. The preferred dimensions are:

| multiframe | 6 HE 233-mm tall | 84 TE = 19" |
| 1 module | 6 HE | 4 TE = 20.4 mm |

The individual modules will be explained below.

A main amplifier consists of several components. For example, a front panel has sixteen LEMO inputs with a test jack for the output The incoming pre-amplifier signals (16 per module) are amplified to the desired amplitude in a main amplifier (filter amplifier) located downstream. The signal is processed into a unipolar, Gaussian signal by means of differentiation and integration and then supplied to the ADC on the FPGA/ADC module.

A private bus connects the FPGA/ADC card to 16 channels of the analog main amplifier (Analog In). The coupling to the bus is done by means of a cPCI plug in which the upper part of the plug serves for communication of the FPGA/ADC cards among each other, while the lower part of the plug is used for the analog input signals. In order to ensure good shielding of the analog signals, every ADC signal is arranged between GND contacts. No crosslink signals between the FPGA/ADC cards are needed for operation as a linear detector.

A standard VME backplane serves for rapid communication of the FPGA/ADC card with the local bus controller and DSP cards.

Additional details can be gleaned from the functional block diagram of a FPGA/ADC module shown in FIG. 5. A CAN bus controller of the FPGA/ADC card can reconfigure the flash PROMS of the FPGAs. During ongoing operation, any desired FPGA configuration can be loaded and the FPGA can be re-programmed. The microcontroller then stores in its EEPROM which configuration was most recently active and initializes the FPGA with the appropriate configuration after the system is restarted.

Several, in the case at hand 2, configuration PROMS are used in order to ensure a rapid switch-over between various modes of operation.

Each FPGA/ADC card has a first-in-first-out (fifo) module, for instance, a 4 k*36-bit first-in-first-out (fifo) module, that serves to buffer the data. This can store many events (1024 in the case shown here) corresponding to a registering time of about 1 ms.

In order to ensure that the FPGA/ADC printed circuit board can be used for time-of-flight, that is to say, the time-of-flight mode of operation, every card is fitted with a counter (resolution of about 1 $\mu$s). The starting pulse is made available to the FPGAs in a pre-counter that then starts the time base.

The communication of the FPGA/ADC card with the local bus controller and with the DSP cards takes place via the VME backplane.

With the FPGA/ADC bus structure shown in FIG. 6, the FPGA/ADC cards communicate on the private FPGA/analog backplane with each other and with the analog main amplifier. All of the FPGA/ADC cards receive their system clock (80 MHz) from an oscillator installed on the private backplane in order to avoid a clock pulse offset on the cards. The work clock of the ADCs (20 MHz) is derived from the system clock so that here, too, there is no deviation from the overall concept of a synchronous design. The reset signal of the FPGA/ADC cards as well as of the TOF counters is likewise corrected via the backplane in the execution time. As a result, each FPGA/ADC card is reset at the same time.

The control signals of the FPGA bus consist of the reset signal for the TOF counter, the reset signal of the FPGAs and the peak lines. The counter for the timing mark in the TOF mode is implemented on every FPGA/ADC card. Each FPGA/ADC card shows a found maximum value via its peak line. Then all of the cards store their current ADC values (peak values) in their fifos.

Modules to ascertain a detection signal are schematically shown in FIG. 7B. A search function works with the values that have been output by the analog-digital converters (ADC). As soon as a maximum value has been found on one of the channels, all of the ADC values (16 in the case shown here) are transmitted to the first-in-first-out (fifo) module and the data output is blocked for a suitable time span, for instance, about 1 $\mu$s. At the same time, all of the other cards are requested to likewise transmit their ADC values to the fifo. This creates an image of the detector. The person skilled in the art can modify the elements and their arrangement in order to effectuate the displayed processing of the measured values in a different manner.

Moreover, it is examined when a channel k has reached a maximum value. A channel k is said to have a maximum value when the following conditions are fulfilled at a time $t_i$:

1) the ADC value $ADC\_ch_k(t_i)$ has to be above a threshold value;
2) $ADC\_ch_k(t_i) \geq ADC\_ch_{k+1}(t_i)$ and $ADC\_ch_k(t_i) > ADC\_ch_{k-1}(t_i)$;
3) $ADC\_ch_k(t_i) > ADC\_ch_k(t_{i+1})$ Once all of the conditions have been fulfilled, the adjacent segments are instructed via the peak lines of the card to likewise transmit their ADC values to the fifo.

Since the process of peak-finding cannot be executed in one clock cycle (20 MHz) with conventional modules, this process is broken down into several pipeline states. This yields an event output delayed by n*50 ns and increases the resource demand in the FPGA, since for every state, the ADC input signals that belong to this state have to be stored.

FIG. 8 shows the schematic structure of a photomultiplier PM with DAC and HV.

During the stabilization measurement, every photomultiplier PM generates a pulse-height spectrum. The focal point in this pulse-height spectrum should lie in the same channel for all of the photomultipliers PM.

A deviation from this channel on the part of the individual PM signals can be achieved by changing the amplification for the PM in question. For this purpose, DACs that are automatically regulated by means of a control unit are used to vary the cathode voltage of the PM in question until the desired channel number is reached.

A digital signal processor (DSP) is optimized to the mathematical operations that occur during digital signal evaluation. A DSP that is suitable for the signal processing operations encountered is the TMS320c6201/c6701 processor made by Texas Instruments. This DSP (clocked at 200 MHz) can process up to eight 32-bit commands in one cycle having a cycle time of 5 ns. In this manner, the DSP attains a computing capacity of 1600 MIPS.

In order to digitally find the centroid, several, preferably up to 4 double-eurocards, each with four TMS320c6101 processors, can be employed. As a result, digitally finding the centroid can be carried out on several, preferably up to 16, signal processors in parallel.

FIG. 9 shows a suitable signal course in the DSP module. The DSPc62 module is configured as a double-euroformat card whereby the upper module half has a depth of 220 mm, while the lower half has a depth of 160 mm. Therefore, in the lower area, the card is cPCI-compatible with other PCI bus-based single-eurocards.

FIG. 10 shows a schematic structure of the DSP module. An upper plug, for example, a 96-pole VG strip, connects the DSPc62 module to the FPGA event-builder modules via the local bus. A lower plug, for example, a cPCI plug, connects the DSPc62 module with the compact PCI bus and thus with the host computer.

The signal processors (DSP) receive from the local bus controller (LBC) the command to process the detection event present in the fifos. In response, the addressed DSP reads in the ADC values of the complete detector array via the local bus and once again releases the event identification into the FPGAs. The data transfer via the local bus is done with 20 MHz, 32-bit words. This leads to a bus band width of 80 MHz. Therefore, the data package (64 bytes) is read in within 800 ns.

After the read-in, the signal processor takes over the task of finding the centroid. Due to the possibility of loading a program for the signal processor from the host computer, the algorithm can be adapted to differing measuring operations in order to find the centroid. Different signal-processing programs also serve here to make a distinction between 1-D and 2-D detectors.

The centroid that has been found is provided with a timing mark, then stored in a ring memory within the DSP memory and the host computer is informed about this by means of a flag. The host computer is an cPCI-compatible module that runs under the Windows NT or Linux operating system. Then, via the cPCI bus, the host computer retrieves the centroid data from the various signal processors and performs the histogramming. Here, too, different user programs can execute differing measuring operations (1-D, 2-D, calibrations, etc.).

FIG. 11 shows a functional block diagram of the local bus controller (LBC). This local bus controller (LBC) serves to control the sequence of the load distribution to the digital signal processor (DSP) DSPc62 modules that function in parallel on the local bus (LB). Moreover, the LBC provides a CAN interface and also allows connection possibilities for various status displays.

The local bus (LB) serves to quickly transfer data from the FPGA input modules to the DSP that processes the events. It has, for example, the following values:
 32-bit data capacity
 20-MHz reading cycle
 80-Mbyte bandwidth An industrial VME backplane is used as the backplane for the LB. The following signals are used:

| 32 | bit data | data from the FPGA input module to the DSP |
| 16 | *free | one signal per DSP indicates that the latter is FREE |
| 4 | Go0..3 | 4-bit coding, which DSP is the next in line |
| 1 | *GO | strobe signal, DSP take-over |
| 1 | *RD_FPGA | reading cycle to the FPGA module (RD of the FIFOs) (this signal is generated by the active DSP) |
| 4 | *CS_FPGA | CS to one of the four FPGA input modules (this signal is generated by the active DSP) |
| 4 | *Event | indicates an event |
| 4 | *FIFOXne | fifo 0..3 Not Empty (data is present) |

Shown below are preferred signal courses within the range of the local bus (LB).

An FPGA input module recognizes an event
  all of the FPGA input modules are blocked
  every FPGA input module writes its ADC bytes into the FIFO
  the fifo is set up as a 32-bit output bus
  the *EVENT signal is activated (Fifo X NotEmpty)
  the FPGA input modules are free once again (maximum of 1 μs)
The local bus controller (LBC) recognizes the *EVENT signal
  the LBC looks for a free DSP (*FREE signals)
  the LBC selects a free DSP (Go 0 . . . 3 signals)
  the LBC activates the *GO signal
The selected DSP
  activates the 4 FPGA modules one after the other (*CS_FPGA0 . . . 3)
  and reads 4 double words from each module (*RD_FPGA)
  at the end, its *FREE signal is removed
  the LBC recognizes that the DSP has started working and removes the *GO signal The DSP processes the read-in data
  processing of the 8×8 image
  storing of the event in a local memory buffer
  when the buffer is full, placement of a flag for the host
  once ready, placement of *FREE signal
The host CPU
  polls all DSPs to check whether the buffer is full
  reads in a DSP event buffer
  creates increments in the spectrum memory
  transfers the image upon request via the network
  stores the image on the local hard drive
For example, the local bus has the following pin assignment:

|    | A | B | C |
|----|---|---|---|
| 1  | *Free0 | *Event0 | D00 |
| 2  | *Free1 | *Event1 | D01 |
| 3  | *Free2 | *Event2 | D02 |
| 4  | *Free3 | — | D03 |
| 5  | *Free4 | — | D04 |
| 6  | *Free5 | — | D05 |
| 7  | *Free6 | — | D06 |
| 8  | *Free7 | — | D07 |
| 9  | GND | — | GND |
| 10 | SysCLK | — | *Event3 |
| 11 | GND | — | |
| 12 | *Free8 | *FifoONE | |
| 13 | *Free9 | *Fifo1NE | D08 |
| 14 | *Free10 | *Fifo2NE | D09 |
| 15 | GND | *Fifo3NE | D10 |
| 16 | *RD_FPGA | *CS_InBoard0 | D11 |
| 17 | GND | *CS_InBoard1 | D12 |
| 18 | *Free 11 | *CS_InBoard2 | D13 |
| 19 | GND | *CS_InBoard3 | D14 |
| 20 | *Free 12 | GND | D15 |
| 21 | — | CAN-H | D16 |
| 22 | — | CAN-L | D17 |
| 23 | *Free13 | GND | D18 |
| 24 | *Free14 | | D19 |
| 25 | *Free15 | D31 | D20 |
| 26 | *YouGo0 | D30 | D21 |
| 27 | *YouGo1 | D29 | D22 |
| 28 | *YouGo2 | D28 | D23 |
| 29 | *YouGo3 | D27 | D24 |
| 30 | *GO | D26 | D25 |
| 31 | −12 volt | +V STDBY | +12 volt |
| 32 | +5 volt | +5 volt | +5 volt |

Preferably, a host computer takes over the entire configuration of the system and, by downloading the appropriate DSP programs and starting the user programs, it determines which measurement should be carried out.

An example of a suitable host computer is a commercially available cPCI module with at least a Pentium processor. Naturally, any other processor with comparable computing power can also be used. The host computer has a local hard drive, a diskette drive, a connection for a mouse, keyboard and monitor as well as preferably also a network port.

The host computer runs under a suitable operating system, for instance, Windows NT or LINUX. Moreover, it also serves as a development platform for additional programs. Both the DSP program as well as the FPGA program can be developed here or else the developed programs can be stored on the hard drive.

When the user program is started, all of the FPGAs and DSPs are loaded with the appropriate measuring program and the measuring operation is started.

The host computer reads out the measured results (centroid, coordinates) prepared by the DSPc62 and performs the histogramming in the 1-D or 2-D space.

The histogram data can be displayed on the local monitor or sent to other evaluation computers via the network.

Other useful components of the detector system are:
outputs: rate meter output for counted events,
rate meter for uncounted events,
rate meter output for several, preferably all events,
LED display,
Ethernet connection,
frame for the mains power supply,
temperature monitoring.

FIG. 12 shows an example of the addressing of a memory cell in order to store the detection event.

The addressing of a memory cell—storing—should be done to the position where the neutron absorption has taken place. This is only possible to a limited extent since the available PM signals $S_{ik}$ are stochastic quantities that fluctuate around their anticipated values $B_{ik}$ (x, y) and thus do not constitute clear-cut functions of the position. Only their anticipated values are well-defined functions of the position of the neutron absorption. In principle, the position cannot be determined any more precisely than by searching for the most likely position for the generated PM signals. For this purpose, it is necessary to know the anticipated values of all of the multiplier signals as a function of the event positions (x, y). The memory addresses then become identical—except for a scale factor and an offset value—to the most likely positions ascertained $(x_w, Y_w)$. An event is then stored in that the content of the memory cell is increased by 1.

In the embodiments presented here, the distributor and the signal processor are realized by means of especially suitable electronic circuitry. However, instead of the electronic circuitry, one or more optical circuits can likewise be provided or else one or more computers can be employed to process the signals.

In particular, the evaluation unit consists of a circuitry arrangement equipped with means to perform logical comparisons, a computer or a computer component. The term "computer" should not be construed here in any limiting manner. It can refer to any unit that is suitable for performing calculations, for example, a work station, a personal computer, a microcomputer or else a circuitry arrangement suitable for performing calculations.

What is claimed is:

1. An evaluation unit to evaluate detector events registered by one or more detectors, the evaluation unit comprising:
   a plurality of signal processors for processing signals generated by the one or more detectors; and
   at least one distributor for relaying the signals generated by the one or more detectors to at least one of the plurality of signal processors, the distributor being configured to relay the signals to a signal processor having free processing capacity.

2. An evaluation unit according to claim 1, wherein the distributor comprises a digital module.

3. An evaluation unit according to claim 2, wherein the digital module is a digital gate array.

4. An evaluation unit according to claim 3, wherein the digital gate array is a Field Programmable Gate Array (FPGA).

5. An evaluation unit according to claim 1, wherein each of the plurality of signal processors is a digital signal processor (DSP).

6. An evaluation unit according to claim 1, further comprising at least one module for carrying out an analog signal processing operation.

7. An evaluation unit according to claim 6, wherein the module executes a pulse shaping and/or an amplification.

8. An evaluation unit according to claim 1, further comprising analog-digital converters (ADC) switched in parallel to each other.

9. An evaluation unit according to claim 1, wherein the evaluation unit allocates radiation events to time-of-flight channels that are different from each other.

10. An evaluation unit according to claim 1, wherein for detection events that are registered by differing detectors and/or detector groups, the evaluation unit uses the signals of the detector and/or detector group as the detection event to be processed.

11. An evaluation unit according to claim 1, further comprising a comparator for checking whether an intensity of a detection signal at least reaches a threshold value.

12. An evaluation unit according to claim 11, wherein the evaluation unit treats detection signals whose intensity at least matches the threshold value differently from detection signals whose intensity is less than the threshold value.

13. An evaluation unit according to claim 11, wherein the threshold value is pre-defined.

14. An evaluation unit according to claim 11, wherein the threshold value varies as a function of the magnitude of the signals that occur.

15. An evaluation units according to claim 11, wherein the detection signal is standardized whereby the detection signal strengths resulting from the standardization is kept at an essentially constant mean intensity level within one measuring cycle.

16. A detector system, comprising:
   one or more detectors for registering detector events; and
   an evaluation unit having a plurality of signal processors for processing signals generated by the one or more detectors, and at least one distributor for relaying the signals generated by the one or more detectors to at least one of the plurality of signal processors, the distributor being configured to relay the signals to a signal processor having free processing capacity.

* * * * *